United States Patent
Kotecha (12) 
(10) Patent No.: US 8,780,907 B2
(45) Date of Patent: Jul. 15, 2014

(54) OPTIMIZED FILE REPAIR ARCHITECTURE FOR MOBILE BROADCAST MULTICAST SYSTEM (MBMS)

(75) Inventor: Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 120 days.

(21) Appl. No.: 13/251,723

(22) Filed: Oct. 3, 2011

(65) Prior Publication Data

US 2013/0083795 A1 Apr. 4, 2013

(51) Int. Cl.
*H04L 12/28* (2006.01)

(52) U.S. Cl.
USPC .......................................................... 370/390

(58) Field of Classification Search
USPC .......................................................... 370/390
See application file for complete search history.

(56) References Cited

U.S. PATENT DOCUMENTS

| | | | |
|---|---|---|---|
| 2002/0035604 A1* | 3/2002 | Cohen et al. | 709/205 |
| 2007/0133565 A1* | 6/2007 | Hyun et al. | 370/395.52 |
| 2008/0183885 A1* | 7/2008 | Durrey et al. | 709/231 |
| 2009/0077247 A1* | 3/2009 | Bouazizi et al. | 709/229 |
| 2009/0307337 A1* | 12/2009 | Marshall et al. | 709/220 |
| 2009/0319824 A1* | 12/2009 | Liu et al. | 714/4 |
| 2010/0281178 A1* | 11/2010 | Sullivan | 709/231 |
| 2011/0078125 A1* | 3/2011 | Perkuhn et al. | 707/694 |
| 2012/0236776 A1* | 9/2012 | Zhang et al. | 370/312 |
| 2012/0243459 A1* | 9/2012 | Wu et al. | 370/312 |

OTHER PUBLICATIONS

Shen et al. XOR Retransmission in Multicast Error Recovery, 2000, p. 336-340.*

* cited by examiner

*Primary Examiner* — Brandon Renner
*Assistant Examiner* — Faisal Choudhury

(57) ABSTRACT

A device receives or creates file packets to be broadcast, via multicast delivery, to multiple user equipment by a broadcast multicast service control (BMSC) device. The device stores the file packets in the memory, and receives, via unicast delivery, a file repair request from a particular user equipment of the multiple user equipment. The device identifies particular file packets in the memory based on the file repair request, and provides, via unicast delivery, the particular file packets to the particular user equipment.

24 Claims, 8 Drawing Sheets

FIG. 5

OPTIMIZED FILE REPAIR ARCHITECTURE FOR MOBILE BROADCAST MULTICAST SYSTEM (MBMS)

BACKGROUND

A multimedia broadcast multicast system (MBMS) includes a point-to-multipoint (PMP) interface specification for existing and upcoming Third Generation Partnership Project (3GPP) cellular networks. MBMSs are designed to provide efficient delivery of broadcast and multicast services, both within a cell as well as within a core network. For broadcast transmission across multiple cells, it defines transmission via single-frequency network configurations.

Typically, a MBMS is used for delivering real time content, such as audio and/or video, to a large number of user equipment (UEs) at the same time. A MBMS could also be used to deliver file content, such as a mobile software upgrade, to a large number of UEs at the same time. Such file content delivery requires data integrity and any packet loss of the file content by a particular UE needs to be retransmitted back to the particular UE.

One method used by UEs to retrieve lost packets of delivered file content (i.e., a file repair) includes requesting the lost packets via unicast transmissions and receiving the lost packets via unicast transmissions. The file content may be delivered using a protocol (e.g., a file delivery over unidirectional transport (FLUTE) protocol) from a network device in a mobile operator network called a broadcast multicast service control (BMSC). A BMSC is designed to handle broadcast delivery of file content to multiple UEs, but is not designed to handle a large number of UEs making file repair requests. If a large number of UEs make file repair requests to the BMSC, the large number of file repair requests may tax the BMSC and could result in a denial of service (DoS) attack on the mobile operator network. Furthermore, the BMSC must store file content until all UEs are finished making the file repair requests.

DETAILED DESCRIPTION OF PREFERRED EMBODIMENTS

The following detailed description refers to the accompanying drawings. The same reference numbers in different drawings may identify the same or similar elements.

Systems and/or methods described herein may provide an optimized file repair architecture for MBMS by moving file repair functionality from a BMSC (e.g., in a mobile operator network) to a data center device providing server centric data center applications. The data center device may make it simpler to scale for and handle a large amount of file repair requests received by multiple UEs.

In one example implementation, the data center device may receive file content to be multicast broadcast to multiple UEs by a BMSC, and may encode the file content for delivery in one or more packets (called "file packets" herein). Alternatively, the data center device may receive file packets to be broadcast to multiple UEs by the BMSC and via multicast delivery. The data center device may store the file packets in a local storage, and may receive a file repair request from a particular UE via a unicast delivery. The data center device may locate particular file packets from the local storage based on the file repair request, and may provide the particular file packets to the particular UE via a unicast delivery. Such an arrangement may ensure that the BMSC is not taxed due to a large number of file repair requests, and may enable the BMSC to remove the file content from storage after the file content has been broadcast to multiple UEs.

As used herein, the terms "subscriber" and/or "user" may be used interchangeably. Also, the terms "subscriber" and/or "user" are intended to be broadly interpreted to include a UE, or a user of a UE.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

The term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

Figure 1:
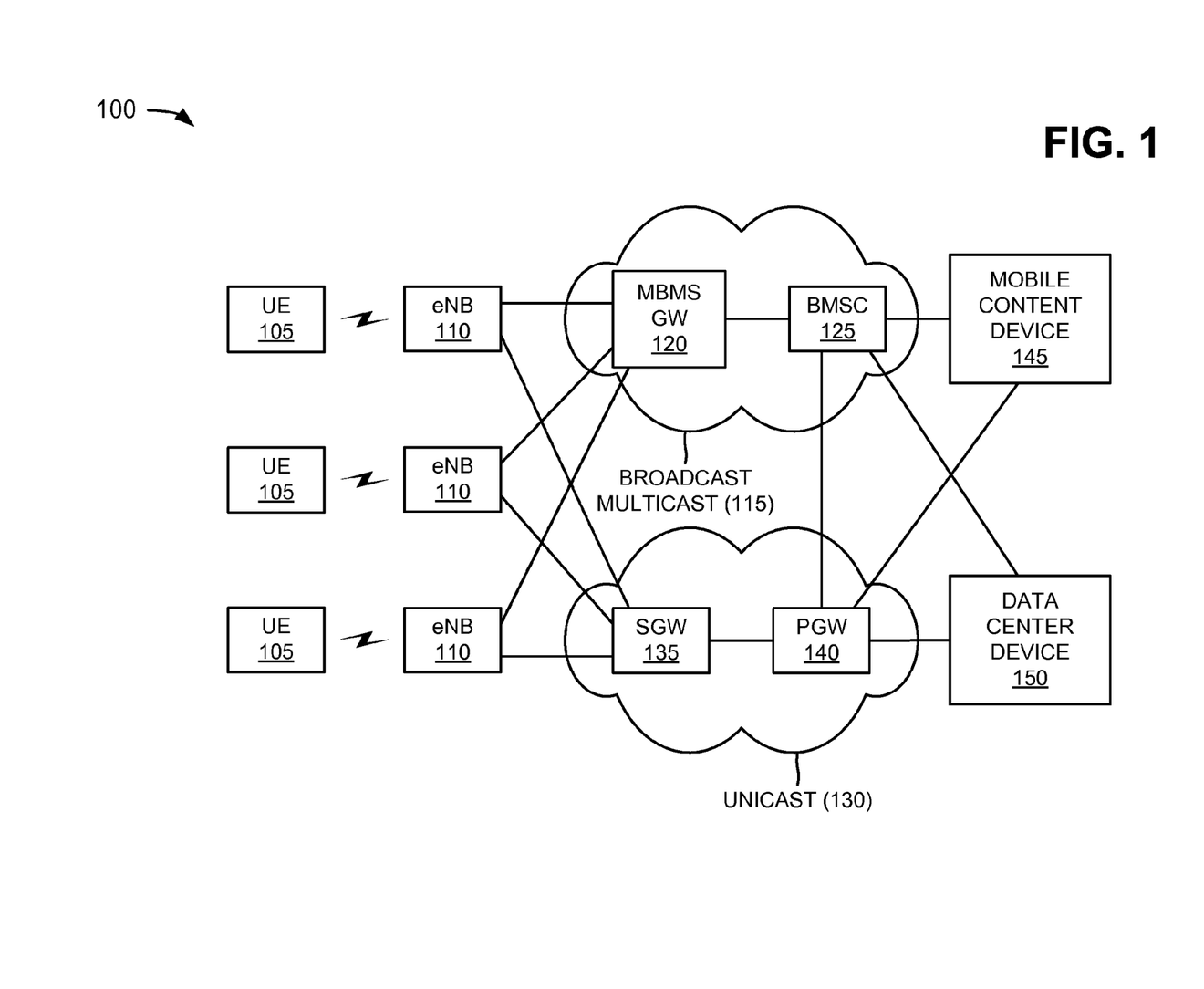
FIG. 1 is a diagram of an example network in which systems and/or methods described herein may be implemented.

FIG. 1 is a diagram of an example network 100 in which systems and/or methods described herein may be implemented. As illustrated, network 100 may include multiple UEs 105; multiple eNBs 110; a broadcast multicast network 115 that includes a MBMS gateway (GW) 120 and a BMSC 125; a unicast network 130 that includes a serving gateway (SGW) 135, and a packet data network (PDN) gateway (PGW) 140; a mobile content device 145; and a data center device 150. Devices and/or networks of network 100 may interconnect via wired and/or wireless connections. For example, UE 105 may wirelessly interconnect with one or more eNBs 110. Three UEs 105, three eNBs 110, one broadcast multicast network 115, one MBMS GW 120, one BMSC 125, one unicast network 130, one SGW 135, one PGW 140, one mobile content device 145, and one data center device 150 have been illustrated in FIG. 1 for simplicity. In practice, there may be more UEs 105, eNBs 110, broadcast multicast networks 115, MBMS GWs 120, BMSCs 125, unicast networks 130, SGWs 135, PGWs 140, mobile content devices 145, and/or data center devices 150 than depicted in FIG. 1.

UE 105 may include a radiotelephone; a personal communications system (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; or other types of computation and/or communication devices. In one example, UE 105 may include a device that is capable of communicating with BMSC 125 and/or data center device 150 via eNB 110.

eNB 110 may include one or more computation and/or communication devices that receive file content from BMSC 125 and/or data center device 150 and wirelessly transmit that file content to UE 105. The file content may include data, files, portions (e.g., packets) of data and/or files, mobile software, mobile software upgrades, etc. eNB 110 may also include one or more devices that wirelessly receive information (e.g., file content, file repair requests, etc.) from UE 105 and transmit that information to BMSC 125, data center device 150, and/or to other UEs 105. eNB 110 may combine the functionalities of a base station and a radio network controller (RNC) in second generation (2G) or third generation (3G) radio access networks.

Broadcast multicast network 115 may include one or more devices that transfer/receive traffic (e.g., packets) to/from a circuit-switched and/or packet-switched network. In one implementation, broadcast multicast network 115 may include a local area network (LAN), a wide area network (WAN), a metropolitan area network (MAN), and/or other networks that provide multicast transmissions of file content to one or more UEs 105. As shown in FIG. 1, broadcast multicast network 115 may include MBMS GW 120 and BMSC 125.

MBMS GW 120 may include one or more traffic transfer devices (or network devices), such as a gateway, a router, a switch, a firewall, a network interface card (NIC), a hub, a bridge, a proxy server, an optical add-drop multiplexer (OADM), or some other type of device that processes and/or transfers traffic. In one example implementation, MBMS GW 120 may route and forward file content (e.g., file packets), received from BMSC 125, to one or more eNBs 110 via a multicast transmission (e.g., simultaneously in a single transmission).

BMSC 125 may include one or more computation and/or communication devices, that gather, process, and/or provide information in a manner described herein. For example, BMSC 125 may include a server device, a workstation computer, a network device, etc. In an example implementation, BMSC 125 may receive file content from mobile content device 145, and may create file packets based on the file content. In one implementation, the file packets may include file packets created using FLUTE protocol parameters. BMSC 125 may provide the file packets to MBMS GW 120 for multicast transmission to multiple eNBs 110.

Unicast network 130 may include one or more devices that transfer/receive traffic (e.g., packets) to/from a circuit-switched and/or packet-switched network. In one implementation, unicast network 130 may include a LAN, a WAN, a MAN, and/or other networks that provide unicast transmissions of file repair packets to one or more UEs 105. As shown in FIG. 1, unicast network 130 may include SGW 135 and PGW 140.

SGW 135 may include one or more traffic transfer devices (or network devices), such as a gateway, a router, a switch, a firewall, a NIC, a hub, a bridge, a proxy server, an OADM, or some other type of device that processes and/or transfers traffic. In one example implementation, SGW 135 may route and forward file repair requests to data center device 150, and may route and forward file repair packets to UEs 105. SGW 135 may act as a mobility anchor for a user plane during inter-eNB handovers. For an idle state UE 105, SGW 135 may terminate a downlink (DL) data path and may trigger paging when DL traffic arrives for UE 105. SGW 135 may manage and store contexts associated with UE 105 (e.g., parameters of an Internet protocol (IP) bearer service, network internal routing information, etc.).

PGW 140 may include one or more traffic transfer devices (or network devices), such as a gateway, a router, a switch, a firewall, a NIC, a hub, a bridge, a proxy server, an OADM, or some other type of device that processes and/or transfers traffic. In one example implementation, PGW 140 may provide connectivity of UE 105 to external PDNs by being a traffic exit/entry point for UE 105. UE 105 may simultaneously connect to more than one PGW 140 for accessing multiple PDNs. PGW 140 may perform policy enforcement, packet filtering for each user, charging support, lawful intercept, and packet screening.

Mobile content device 145 may include one or more computation and/or communication devices, that gather, process, and/or provide information in a manner described herein. For example, mobile content device 145 may include a server device, a workstation computer, a network device, etc. In an example implementation, mobile content device 145 may provide file content to BMSC 125 for multicast delivery to one or more UEs 105. For example, mobile content device 145 may include a device that provides mobile software upgrades (e.g., upgrades to applications provided on UEs 105) to BMSC 125 for multicast delivery to one or more UEs 105.

Data center device 150 may include one or more computation and/or communication devices, that gather, process, and/or provide information in a manner described herein. For example, data center device 150 may include a server device, a workstation computer, a network device, etc. located at a data center of a service provider, such as a telecommunications service provider. In an example implementation, data center device 150 may receive file content to be broadcast to multiple UEs 105 via multicast delivery, and may create file packets based on the file content. Alternatively, data center device 150 may receive file packets to be broadcast to multiple UEs 105 via multicast delivery. Data center device 150 may store the file packets in a local storage, and may receive a file repair request from a particular UE 105 via a unicast transmission. Data center device 150 may locate particular file packets from the local storage based on the file repair request, and may provide the particular file packets to the particular UE 105 via a unicast transmission.

Although FIG. 1 shows example devices/networks of network 100, in other implementations, network 100 may include fewer devices/networks, different devices/networks, differently arranged devices/networks, or additional devices/networks than depicted in FIG. 1. Alternatively, or additionally, one or more devices/networks of network 100 may perform one or more other tasks described as being performed by one or more other devices/networks of network 100.

Figure 2:
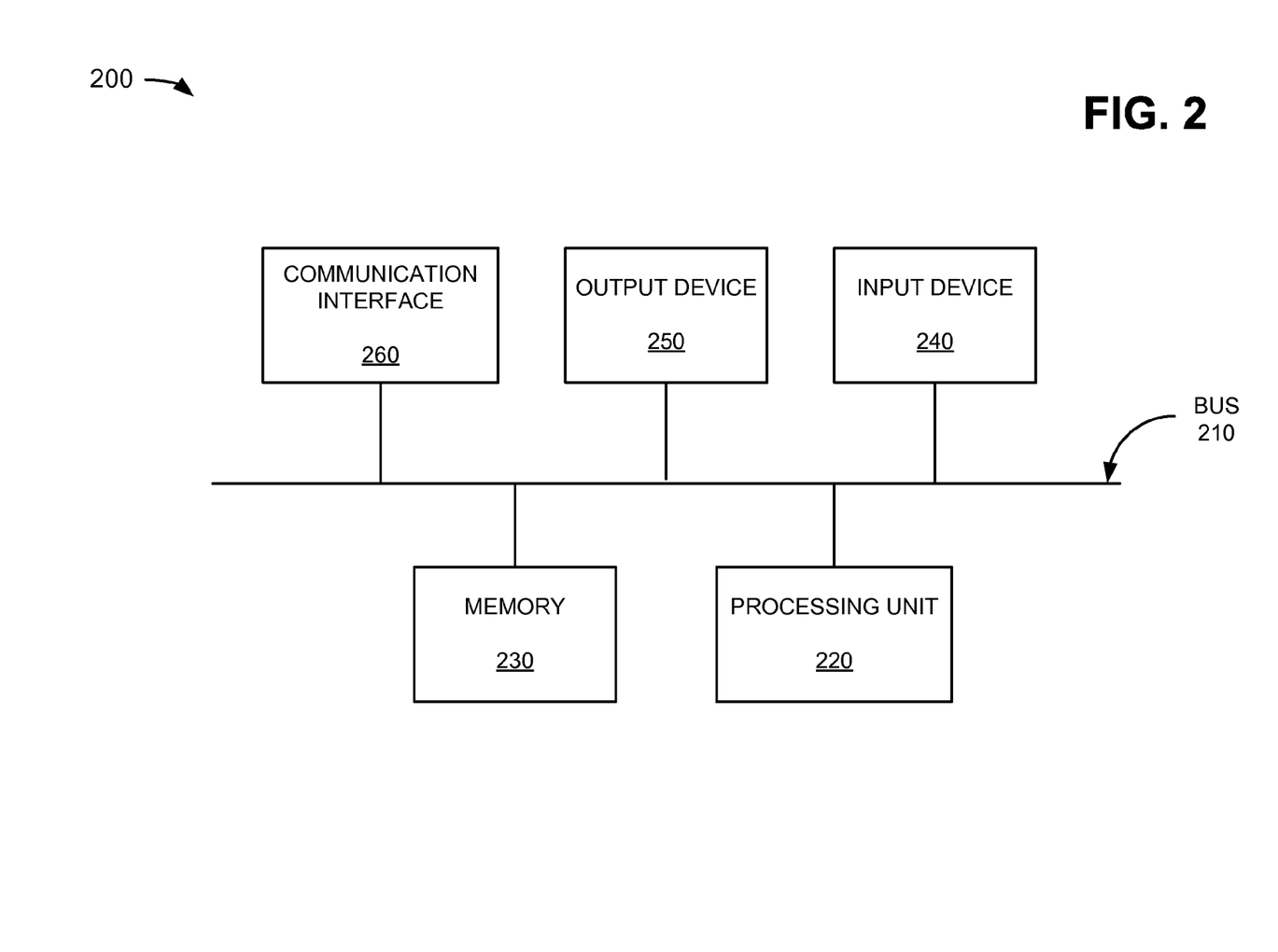
FIG. 2 is a diagram of example components of a device that may correspond to one of the devices of the network depicted in FIG. 1.

FIG. 2 is a diagram of example components of a device 200 that may correspond to one of the devices of network 100. In one example implementation, one or more of the devices of network 100 may include one or more devices 200 or one or more components of device 200. As illustrated in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more ASICs, FPGAs, or the like.

Memory 230 may include a RAM or another type of dynamic storage device that stores information and instructions for execution by processing unit 220, a ROM or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, a touch screen display, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
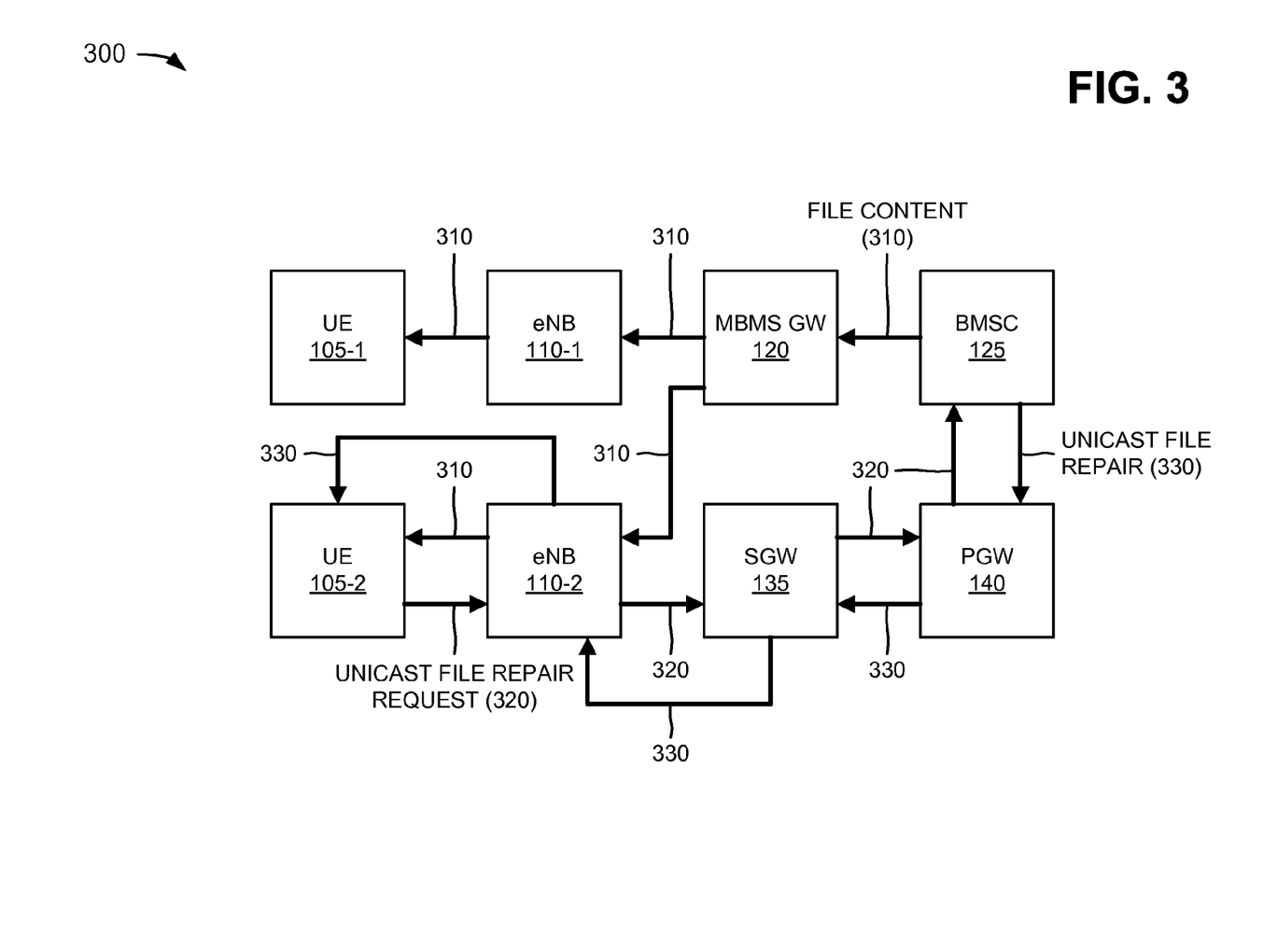
FIG. 3 is a diagram of example file content delivery operations capable of being performed by an example portion of the network in FIG. 1.

FIG. 3 is a diagram of example file content delivery operations capable of being performed by an example portion 300 of network 100 (FIG. 1). As shown, network portion 300 may include a first UE 105-1, a second UE 105-2, a first eNB 110-1, a second eNB 110-2, MBMS GW 120, BMSC 125, SGW 135, and PGW 140. UEs 105, eNBs 110, MBMS GW 120, BMSC 125, SGW 135, and PGW 140 may include the features described above in connection with, for example, one or more of FIGS. 1 and 2.

As further shown in FIG. 3, when BMSC 125 has file content 310 to broadcast to multiple UEs 105, BMSC 125 may provide file content 310 to MBMS GW 120 using a protocol, such as the FLUTE protocol. File content 310 may include data, files, portions (e.g., packets) of data and/or files, mobile software, mobile software upgrades, etc. MBMS GW 120 may provide file content 310 to first eNB 110-1 and second eNB 110-2 via multicast delivery. First eNB 110-1 may provide file content 310 to first UE 105-1, and second eNB 110-2 may provide file content 310 to second UE 105-2.

First UE 105-1 and second UE 105-2 may receive file content 310, and may determine whether any packets are missing from file content 310. If, for example, second UE 105-2 detects any missing packets in file content 310, second UE 105-2 may generate a unicast file repair request 320 for the missing packets. Unicast file repair request 320 may include, for example, a hyptertext transfer protocol (HTTP) GET request for the missing packets. Second UE 105-2 may provide unicast file repair request 320 to second eNB 110-2, and second eNB 110-2 may forward unicast file repair request 320 to SGW 135 via unicast delivery. SGW 135 may provide unicast file repair request 320 to PGW 140, and PGW 140 may forward unicast file repair request 320 to BMSC 125 via unicast delivery.

BMSC 125 may receive unicast file repair request 320, and may locate the missing packets requested by unicast file repair request 320. BMSC 125 may forward the missing packets (e.g., as a unicast file repair 330) to PGW 140, and PGW 140 may forward unicast file repair 330 to SGW 135 via unicast delivery. SGW 135 may provide unicast file repair 330 to second eNB 110-2, and second eNB 110-2 may forward unicast file repair 330 to second UE 105-2 via unicast delivery. Second UE 105-2 may merge the missing packets in unicast file repair 330 with the incomplete file content 310 in order to recreate the complete file content 310. The process of missing packets recovery may be repeated by one or more other UEs 105.

Figure 4:
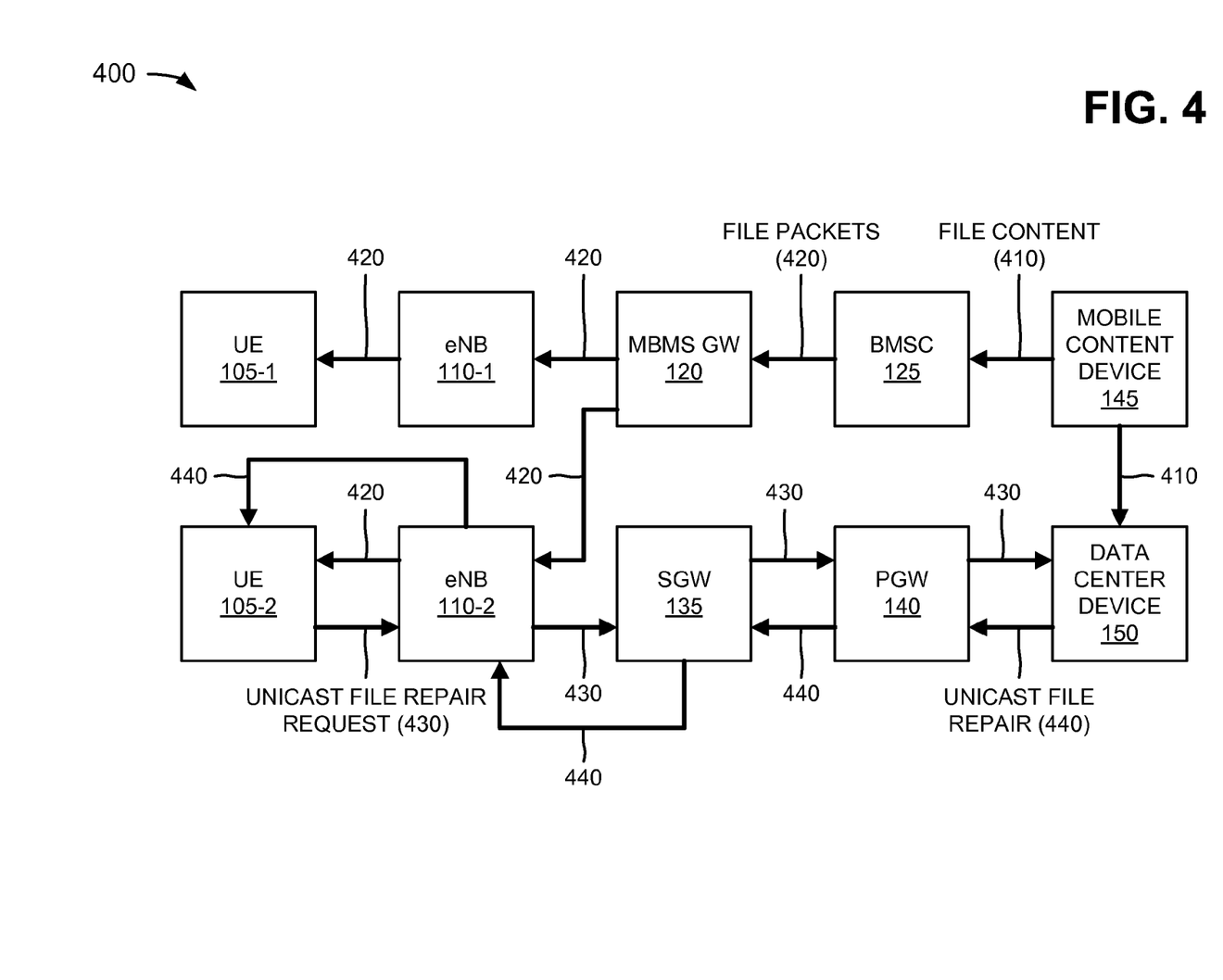
FIG. 4 is a diagram of example file content delivery operations capable of being performed by another example portion of the network in FIG. 1.
Figure 5:
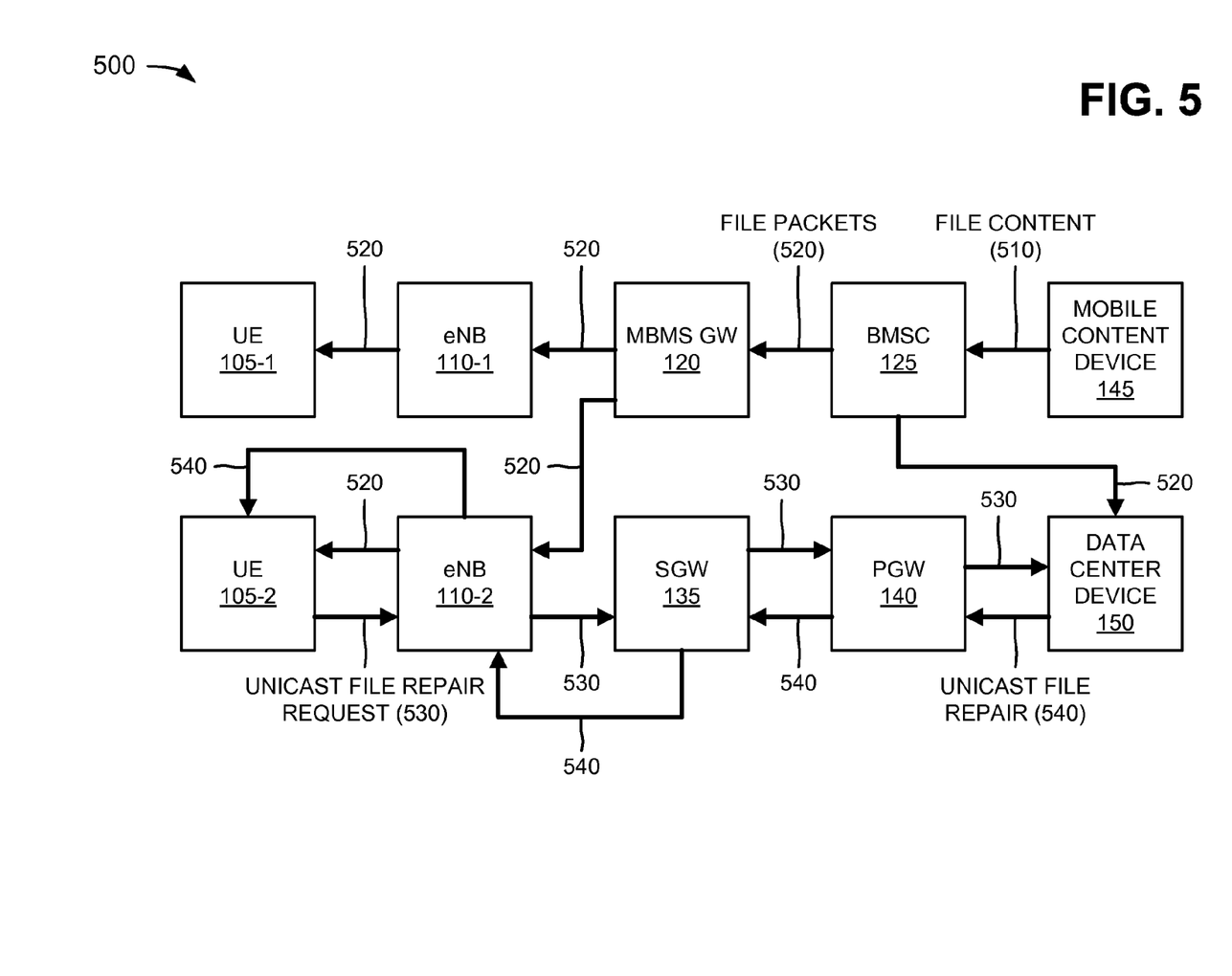
FIG. 5 is a diagram of example file content delivery operations capable of being performed by still another example portion of the network in FIG. 1.

The operations depicted in FIG. 3 may create an architecture challenge for mobile network deployment since BMSC 125 may be designed to handle multicast delivery of file content but may not be designed to handle a large number of UEs 105 making unicast file repair requests 320. Furthermore, such an arrangement may require BMSC 125 to store file content 310 until all UEs 105 are finished making unicast file repair requests 320. FIGS. 4 and 5 depict example operations that may be performed in order to eliminate or reduce the load placed on BMSC 125 by multiple unicast file repair requests 320.

Although FIG. 3 shows example components of network portion 300, in other implementations, network portion 300 may include fewer components, different components, differently arranged components, or additional components than depicted in FIG. 3. Additionally, or alternatively, one or more components of network portion 300 may perform one or more other tasks described as being performed by one or more other components of network portion 300.

FIG. 4 is a diagram of example file content delivery operations capable of being performed by another example portion 400 of network 100 (FIG. 1). As shown, network portion 400 may include first UE 105-1, second UE 105-2, first eNB 110-1, second eNB 110-2, MBMS GW 120, BMSC 125, SGW 135, PGW 140, mobile content device 145, and data center device 150. UEs 105, eNBs 110, MBMS GW 120, BMSC 125, SGW 135, PGW 140, mobile content device 145, and data center device 150 may include the features described above in connection with, for example, one or more of FIGS. 1-3.

In one example implementation, the file repair/recovery functionality of BMSC 125, described above in connection with FIG. 3, may be moved to data center device 150. Data center device 150 may employ the file repair/recovery functionality via one or more modules. BMSC 125 may still provide the file content multicast broadcast functionality described above in connection with FIG. 3. In one example, BMSC 125 and data center device 150 may be configured with identical protocol parameters, such as identical FLUTE protocol parameters, (e.g., forward error correction (FEC) parameters). The identical FEC parameters may ensure that identical data content is created for the FLUTE protocol to operate on FEC-generated content.

In one example, a common FEC function may be provided between BMSC 125 and mobile content device 145 and between mobile content device 145 and data center device 150. The common FEC function may receive file content from mobile content device 145, and may provide synchronized file content to BMSC 125 and to data center device 150. The synchronized file content may enable BMSC 125 and data center device 150 to create identical FLUTE protocol file packets from file content.

As further shown in FIG. 4, mobile content device 145 may provide file content 410 to BMSC 125 and data center device 150 at the same time or at different times. File content 410 may include data, files, portions (e.g., packets) of data and/or files, mobile software, mobile software upgrades, etc. Using the FLUTE protocol parameters, BMSC 125 and data center device 150 may create identical file packets 420 based on file content 410. In one example, file packets 420 may include FLUTE protocol-based file packets that are portions of file content 410. Data center device 150 may store file packets 420 in a local storage device (e.g., memory 230, FIG. 2) associated with data center device 150. BMSC 125 may provide file packets 420 to MBMS GW 120 using a protocol, such as the FLUTE protocol. MBMS GW 120 may provide file packets 420 to first eNB 110-1 and second eNB 110-2 via multicast delivery. First eNB 110-1 may provide file packets 420 to first UE 105-1, and second eNB 110-2 may provide file packets 420 to second UE 105-2.

First UE 105-1 and second UE 105-2 may receive file packets 420, and may determine whether any packets are missing from file packets 420. If, for example, second UE 105-2 detects any missing packets in file packets 420, second UE 105-2 may generate a unicast file repair request 430 for the missing packets. Unicast file repair request 430 may include, for example, a HTTP GET request for the missing packets. Second UE 105-2 may provide unicast file repair request 430 to second eNB 110-2, and second eNB 110-2 may forward unicast file repair request 430 to SGW 135 via unicast delivery. SGW 135 may provide unicast file repair request 430 to PGW 140. However, instead of forwarding unicast file repair request 430 to BMSC 125 (e.g., as described in FIG. 3), PGW 140 may forward unicast file repair request 430 to data center device 150 via unicast delivery.

Data center device 150 may receive unicast file repair request 430, and may locate, in the local storage device, the missing packets requested by unicast file repair request 430. Data center device 150 may forward the missing packets (e.g., as a unicast file repair 440) to PGW 140, and PGW 140 may forward unicast file repair 440 to SGW 135 via unicast delivery. SGW 135 may provide unicast file repair 440 to second eNB 110-2, and second eNB 110-2 may forward unicast file repair 440 to second UE 105-2 via unicast delivery. Second UE 105-2 may merge the missing packets in unicast file repair 440 with the incomplete file packets 420 in order to recreate the complete file packets 420. The process of missing packets recovery may be repeated by one or more other UEs 105.

Although FIG. 4 shows example components of network portion 400, in other implementations, network portion 400 may include fewer components, different components, differently arranged components, or additional components than depicted in FIG. 4. Additionally, or alternatively, one or more components of network portion 400 may perform one or more other tasks described as being performed by one or more other components of network portion 400.

FIG. 5 is a diagram of example file content delivery operations capable of being performed by still another example portion 500 of network 100 (FIG. 1). As shown, network portion 500 may include first UE 105-1, second UE 105-2, first eNB 110-1, second eNB 110-2, MBMS GW 120, BMSC 125, SGW 135, PGW 140, mobile content device 145, and data center device 150. UEs 105, eNBs 110, MBMS GW 120, BMSC 125, SGW 135, PGW 140, mobile content device 145, and data center device 150 may include the features described above in connection with, for example, one or more of FIGS. 1-4.

In one example implementation, the file repair/recovery functionality of BMSC 125, described above in connection with FIG. 3, may be moved to data center device 150. Data center device 150 may employ the file repair/recovery functionality via one or more modules. BMSC 125 may still provide the file content multicast broadcast functionality described above in connection with FIG. 3. In one example, BMSC 125 and data center device 150 may be configured with identical protocol parameters, such as identical FLUTE protocol parameters (e.g., FEC parameters).

As further shown in FIG. 5, mobile content device 145 may provide file content 510 to BMSC 125 but may not provide file content 510 to data center device 150, as described above in connection with FIG. 4. File content 510 may include data, files, portions (e.g., packets) of data and/or files, mobile software, mobile software upgrades, etc. Using the FLUTE protocol parameters, BMSC 125 may create file packets 520 based on file content 510. In one example, file packets 520 may include FLUTE protocol-based file packets that are portions of file content 510.

BMSC 125 may provide file packets 520 to data center device 150. Data center device 150 may receive and store file packets 520 in a local storage device (e.g., memory 230, FIG. 2) associated with data center device 150. BMSC 125 may also provide file packets 520 to MBMS GW 120 using a protocol, such as the FLUTE protocol. In one example, BMSC 125 may provide file packets 520 to MBMS GW 120 and data center device 150 at the same time or at different times. MBMS GW 120 may provide file packets 520 to first eNB 110-1 and second eNB 110-2 via multicast delivery. First eNB 110-1 may provide file packets 520 to first UE 105-1, and second eNB 110-2 may provide file packets 520 to second UE 105-2.

First UE 105-1 and second UE 105-2 may receive file packets 520, and may determine whether any packets are missing from file packets 520. If, for example, second UE 105-2 detects any missing packets in file packets 520, second UE 105-2 may generate a unicast file repair request 530 for the missing packets. Unicast file repair request 530 may include, for example, a HTTP GET request for the missing packets. Second UE 105-2 may provide unicast file repair request 530 to second eNB 110-2, and second eNB 110-2 may forward unicast file repair request 530 to SGW 135 via unicast delivery. SGW 135 may provide unicast file repair request 530 to PGW 140. However, instead of forwarding unicast file repair request 530 to BMSC 125 (e.g., as described in FIG. 3), PGW 140 may forward unicast file repair request 530 to data center device 150 via unicast delivery.

Data center device 150 may receive unicast file repair request 530, and may locate, in the local storage device, the missing packets requested by unicast file repair request 530. Data center device 150 may forward the missing packets (e.g., as a unicast file repair 540) to PGW 140, and PGW 140 may forward unicast file repair 540 to SGW 135 via unicast delivery. SGW 135 may provide unicast file repair 540 to second eNB 110-2, and second eNB 110-2 may forward unicast file repair 540 to second UE 105-2 via unicast delivery. Second UE 105-2 may merge the missing packets in unicast file repair 540 with the incomplete file packets 520 in order to recreate the complete file packets 520. The process of missing packets recovery may be repeated by one or more other UEs 105.

Although FIG. 5 shows example components of network portion 500, in other implementations, network portion 500 may include fewer components, different components, differently arranged components, or additional components than depicted in FIG. 5. Additionally, or alternatively, one or more components of network portion 500 may perform one or more other tasks described as being performed by one or more other components of network portion 500.

Figure 6:
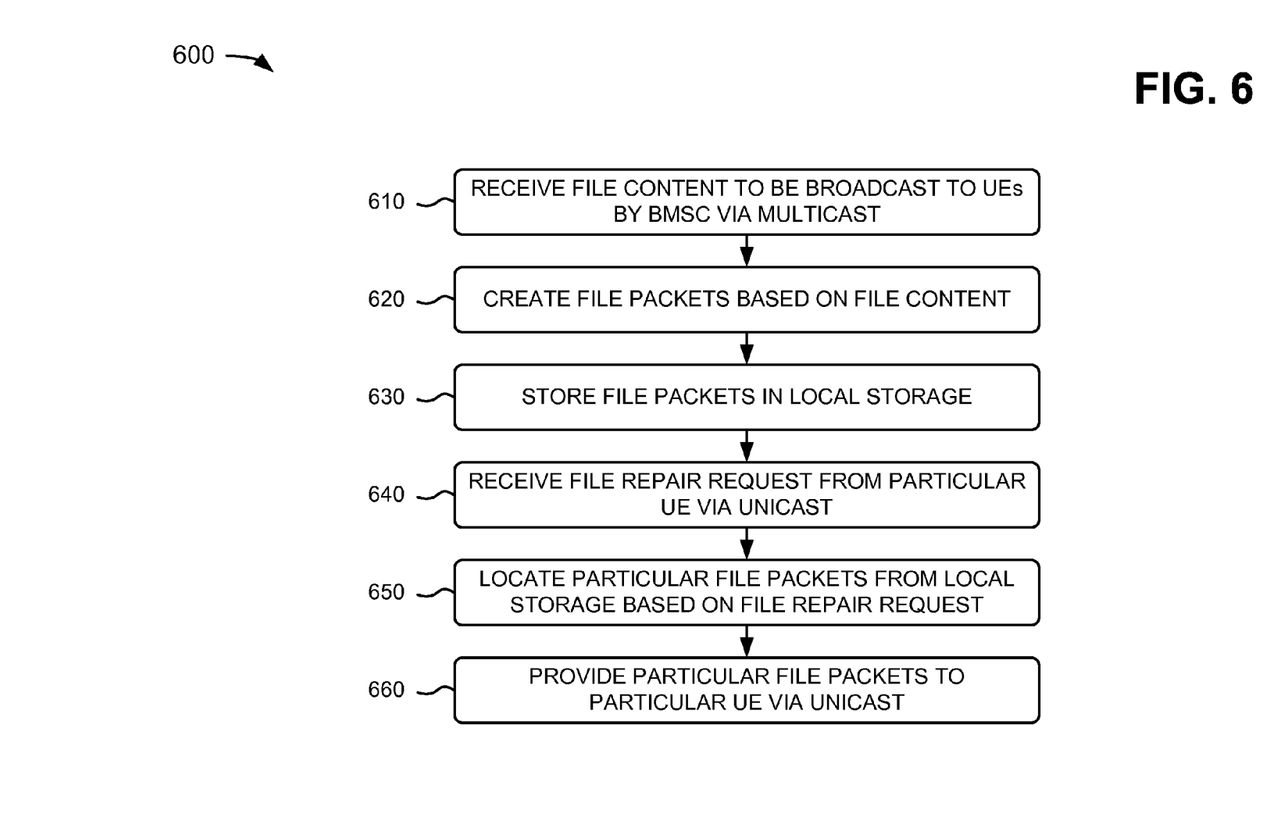
FIG. 6 is a flow chart of an example process for performing optimized file repair operations for MBMS according to an implementation described herein.

FIG. 6 is a flow chart of an example process 600 for performing optimized file repair operations for MBMS according to an implementation described herein. In one implementation, process 600 may be performed by data center device 150. Alternatively, or additionally, some or all of process 600 may be performed by another device or group of devices, including or excluding data center device 150.

As shown in FIG. 6, process 600 may include receiving file content to be broadcast to UEs by a BMSC via multicast delivery (block 610), and creating file packets based on the file content (block 620). For example, in an implementation described above in connection with FIG. 4, mobile content device 145 may provide file content 410 to BMSC 125 and data center device 150 at the same time or at different times. File content 410 may include data, files, portions (e.g., packets) of data and/or files, mobile software, mobile software upgrades, etc. Using the FLUTE protocol parameters, BMSC 125 and data center device 150 may create identical file packets 420 based on file content 410. In one example, file packets 420 may include FLUTE protocol-based file packets that are portions of file content 410.

As further shown in FIG. 6, process 600 may include storing the file packets in a local storage (block 630), and receiving a file repair request from a particular UE via unicast delivery (block 640). For example, in an implementation described above in connection with FIG. 4, data center device 150 may store file packets 420 in a local storage device associated with data center device 150. If second UE 105-2 detects any missing packets in file packets 420, second UE 105-2 may generate unicast file repair request 430 for the missing packets. Unicast file repair request 430 may include, for example, a HTTP GET request for the missing packets. Second UE 105-2 may provide unicast file repair request 430 to second eNB 110-2, and second eNB 110-2 may forward unicast file repair request 430 to SGW 135 via unicast delivery. SGW 135 may provide unicast file repair request 430 to PGW 140. PGW 140 may forward unicast file repair request 430 to data center device 150 via unicast delivery. Data center device 150 may receive unicast file repair request 430.

Returning to FIG. 6, process 600 may include locating particular file packets from the local storage based on the file repair request (block 650), and providing the particular file packets to the particular UE via unicast delivery (block 660). For example, in an implementation described above in connection with FIG. 4, data center device 150 may locate, in the local storage device, the missing packets requested by unicast file repair request 430. Data center device 150 may forward the missing packets (e.g., as unicast file repair 440) to PGW 140, and PGW 140 may forward unicast file repair 440 to SGW 135 via unicast delivery. SGW 135 may provide unicast file repair 440 to second eNB 110-2, and second eNB 110-2 may forward unicast file repair 440 to second UE 105-2 via unicast delivery. Second UE 105-2 may merge the missing packets in unicast file repair 440 with the incomplete file packets 420 in order to recreate the complete file packets 420.

Figure 7:
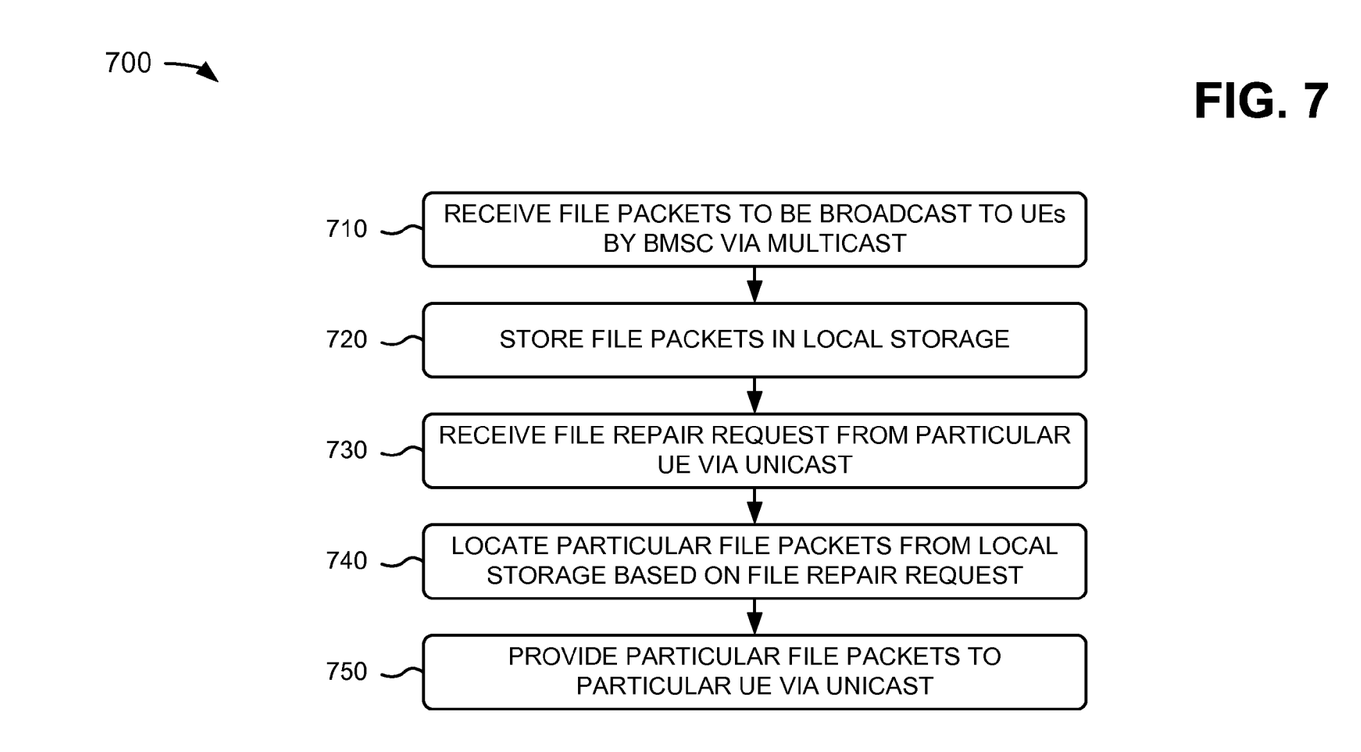
FIG. 7 is a flow chart of an example process for performing alternative optimized file repair operations for MBMS according to an implementation described herein.

FIG. 7 is a flow chart of an example process 700 for performing alternative optimized file repair operations for MBMS according to an implementation described herein. In one implementation, process 700 may be performed by data center device 150. Alternatively, or additionally, some or all of process 700 may be performed by another device or group of devices, including or excluding data center device 150.

As shown in FIG. 7, process 700 may include receiving file packets to be broadcast to UEs by a BMSC via multicast delivery (block 710), and storing the file packets in a local storage (block 720). For example, in an implementation described above in connection with FIG. 5, mobile content device 145 may provide file content 510 to BMSC 125. File content 510 may include data, files, portions (e.g., packets) of data and/or files, mobile software, mobile software upgrades, etc. Using the FLUTE protocol parameters, BMSC 125 may create file packets 520 based on file content 510. BMSC 125 may provide file packets 520 to data center device 150. Data center device 150 may receive and store file packets 520 in a local storage device associated with data center device 150.

As further shown in FIG. 7, process 700 may include receiving a file repair request from a particular UE via unicast delivery (block 730), and locating particular file packets from the local storage based on the file repair request (block 740). For example, in an implementation described above in connection with FIG. 5, if second UE 105-2 detects any missing packets in file packets 520, second UE 105-2 may generate unicast file repair request 530 for the missing packets. Unicast file repair request 530 may include, for example, a HTTP GET request for the missing packets. Second UE 105-2 may provide unicast file repair request 530 to second eNB 110-2, and second eNB 110-2 may forward unicast file repair request 530 to SGW 135 via unicast delivery. SGW 135 may provide unicast file repair request 530 to PGW 140. PGW 140 may forward unicast file repair request 530 to data center device 150 via unicast delivery. Data center device 150 may receive unicast file repair request 530, and may locate, in the local storage device, the missing packets requested by unicast file repair request 530.

Returning to FIG. 7, process 700 may include providing the particular file packets to the particular UE via unicast delivery (block 750). For example, in an implementation described above in connection with FIG. 5, data center device 150 may forward the missing packets (e.g., as unicast file repair 540) to PGW 140, and PGW 140 may forward unicast file repair 540 to SGW 135 via unicast delivery. SGW 135 may provide unicast file repair 540 to second eNB 110-2, and second eNB 110-2 may forward unicast file repair 540 to second UE 105-2 via unicast delivery. Second UE 105-2 may merge the missing packets in unicast file repair 540 with the incomplete file packets 520 in order to recreate the complete file packets 520.

Figure 8:
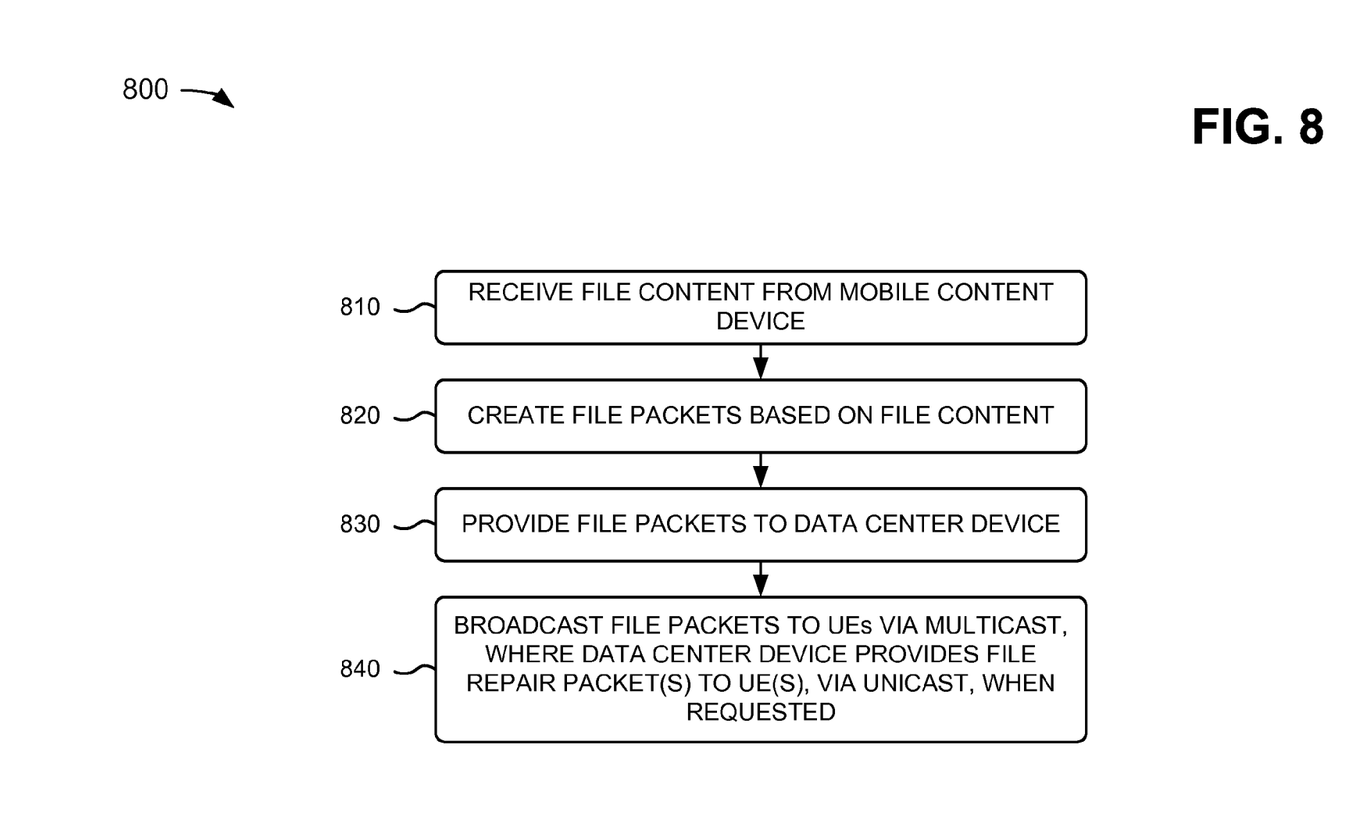
FIG. 8 is a flow chart of an example process for performing file content delivery operations for MBMS according to an implementation described herein.

FIG. 8 is a flow chart of an example process 800 for performing file content delivery operations for MBMS according to an implementation described herein. In one implementation, process 800 may be performed by BMSC 125. Alternatively, or additionally, some or all of process 800 may be performed by another device or group of devices, including or excluding BMSC 125.

As shown in FIG. 8, process 800 may include receiving file content from a mobile content device (block 810), and creating file packets based on the file content (block 820). For example, in an implementation described above in connection with FIG. 5, mobile content device 145 may provide file content 510 to BMSC 125. File content 510 may include data, files, portions (e.g., packets) of data and/or files, mobile software, mobile software upgrades, etc. Using the FLUTE protocol parameters, BMSC 125 may create file packets 520 based on file content 510. In one example, file packets 520 may include FLUTE protocol-based file packets that are portions of file content 510.

As further shown in FIG. 8, process 800 may include providing the file packets to a data center device (block 830), and broadcasting the file packets to UEs via multicast delivery, where the data center device provides file repair packet(s) to UE(s), via unicast delivery, when requested (block 840). For example, in an implementation described above in connection with FIG. 5, BMSC 125 may provide file packets 520 to data center device 150. BMSC 125 may also provide file packets 520 to MBMS GW 120 using a protocol, such as the FLUTE protocol. MBMS GW 120 may provide file packets 520 to first eNB 110-1 and second eNB 110-2 via multicast delivery. If second UE 105-2 detects any missing packets in file packets 520, second UE 105-2 may generate unicast file repair request 530 for the missing packets. Second UE 105-2 may provide unicast file repair request 530 to data center device 150, via SGW 135 and PGW 140. Data center device 150 may receive unicast file repair request 530, and may locate, in the local storage device, the missing packets requested by unicast file repair request 530. Data center device 150 may forward the missing packets (e.g., as unicast file repair 540) to second UE 105-2, via PGW 140 and SGW 135. Second UE 105-2 may merge the missing packets in unicast file repair 540 with the incomplete file packets 520 in order to recreate the complete file packets 520.

Systems and/or methods described herein may provide an optimized file repair architecture for MBMS by moving file repair functionality from a BMSC (e.g., in a mobile operator network) to a data center device providing server centric data center applications. The data center device may make it simpler to scale for and handle a large amount of file repair requests received by multiple UEs.

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 6-8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a data center device from a mobile content device, file content processed into file packets that are broadcast, via multicast delivery, to multiple user equipment by a broadcast multicast service control (BMSC) device associated with a broadcast multicast network;
   creating, by the data center device, file packets that include the file content, wherein the created file packets are identical to the broadcast packets;
   storing, by the data center device, the created file packets in a local storage associated with the device;
   receiving, by the data center device via a unicast network and not via the broadcast multicast network, a file repair request, related to missing file packets, from a particular user equipment of the multiple user equipment, identifying file packets of the broadcast file packets to be recovered;
   locating, by the data center device, particular created file packets from the local storage based on the file repair request, wherein the particular created file packets correspond to the identified file packets; and
   providing, by the data center device, the particular created file packets to the particular user equipment via unicast delivery, wherein the data center device, the mobile content device, and the BMSC device are not the same device.

2. The method of claim 1, where the file content includes one or more of:
   mobile software, and
   mobile software upgrades.

3. The method of claim 1, wherein the created file packets and the broadcast file packets include file delivery over unidirectional transport (FLUTE) protocol-based file packets that each include a portion of the file content.

4. The method of claim 1, wherein the BMSC device creates, from synchronized file content, the broadcast file packets that are identical to the created file packets, which are created by the data center device from the synchronized file content.

5. The method of claim 1, wherein the file repair request includes a hyptertext transfer protocol (HTTP) GET request for the identified file packets.

6. The method of claim 1, wherein the BMSC device and the data center device are configured with identical file delivery over unidirectional transport (FLUTE) protocol parameters for processing the file content.

7. The method of claim 1, wherein the file content is received from the mobile content device via a forward error correction (FEC) function that is common between the data center device and the mobile content device and between the BMSC device and the mobile content device.

8. A data center device, comprising:
   a memory; and
   a processor configured to:
      receive from a mobile content device, or create, first file packets based on file content encoded into second file packets that are broadcast, via multicast delivery, to multiple user equipment by a broadcast multicast service control (BMSC) device associated with a broadcast multicast network, store the first file packets in the memory, receive, via a unicast network and not via the broadcast multicast network, a file repair request, related to missing file packets, from a particular user equipment of the multiple user equipment, identifying file packets of the second file packets to be recovered based on the file repair request, retrieve particular first file packets, corresponding to the identified file packets, from the memory based on the file repair request, and provide, via unicast delivery, the particular first file packets to the particular user equipment, wherein the data center device, the mobile content device, and the BMSC device are not the same device.

9. The data center device of claim 8, wherein the first file packets are created from the file content received by the data center device.

10. The data center device of claim 9, wherein the first file packets and the second file packets include file delivery over unidirectional transport (FLUTE) protocol-based file packets that each include a portion of the file content.

11. The data center device of claim 9, wherein the BMSC device creates, from the file content, the second file packets that are identical to the first file packets created by the data center device.

12. The data center device of claim 8, wherein the data center device receives the first file packets from the BMSC device.

13. The data center device of claim 8, where the file repair request includes a hyptertext transfer protocol (HTTP) GET request for the identified file packets.

14. The data center device of claim 8, where the BMSC device and the data center device are configured with identical file delivery over unidirectional transport (FLUTE) protocol parameters.

15. The data center device of claim 8, where the BMSC device and the data center device are configured with identical forward error correction (FEC) parameters.

16. A method, comprising:
receiving, by a device, file content from a mobile content device;

creating, by the device, first file packets and second file packets that include the file content, wherein the first file packets and the second file packets are identical;

providing, by the device, the first file packets to a data center device; and broadcasting, by the device and via multicast delivery, the second file packets to multiple user equipment, wherein the data center device provides, via unicast delivery, one or more file repair packets of the first file packets, to a particular user equipment of the multiple user equipment when file repair is requested by the particular user equipment, related to missing file packets, with respect to identified ones of the second file packets to be recovered, wherein the data center device, the device, and the mobile content device are not the same device.

17. The method of claim 16, where the file content includes one or more of:
mobile software, and
mobile software upgrades.

18. The method of claim 16, wherein the first and second file packets include file delivery over unidirectional transport (FLUTE) protocol-based file packets that each include a portion of the file content.

19. The method of claim 16, where the device and the data center device are configured with identical file delivery over unidirectional transport (FLUTE) protocol parameters.

20. A device, comprising:
a processor configured to:
receive file content from a mobile content device,
create multiple sets of file packets based on the file content,
provide a first set of the file packets to a data center device, and
broadcast a second set of the file packets to multiple user equipment via multicast transmissions,
wherein the data center device provides, via unicast transmissions, one or more file repair packets of the first set of the file packets, to a particular user equipment of the multiple user equipment when packet repair, related to missing file packets, is requested by the particular user equipment with respect to identified ones of the second file packets to be recovered, wherein the data center device, the device, and the mobile content device are not the same device.

21. The device of claim 20, where the device comprises a broadcast multicast service control (BMSC) device.

22. The device of claim 20, where the file content includes one or more of:
mobile software, and
mobile software upgrades.

23. The device of claim 20, wherein the first and second sets of the file packets include file delivery over unidirectional transport (FLUTE) protocol-based file packets that each include a portion of the file content.

24. The device of claim 20, where the device and the data center device are configured with identical file delivery over unidirectional transport (FLUTE) protocol parameters.

* * * * *